(12) United States Patent
Kirsch, II et al.

(10) Patent No.: US 9,213,580 B2
(45) Date of Patent: Dec. 15, 2015

(54) TRANSPORTABLE PRIVATE CLOUD COMPUTING PLATFORM AND ASSOCIATED METHOD OF USE

(75) Inventors: Robert A. Kirsch, II, Mobile, AL (US); Alfredo Cesar Guzman, Manassas, VA (US); Roger Joseph Channing, Fairfax Station, VA (US)

(73) Assignee: Microtechnologies LLC, Vienna, VA (US)

( * ) Notice: Subject to any disclaimer, the term of this patent is extended or adjusted under 35 U.S.C. 154(b) by 971 days.

(21) Appl. No.: 13/360,157

(22) Filed: Jan. 27, 2012

(65) Prior Publication Data

US 2013/0198384 A1    Aug. 1, 2013

(51) Int. Cl.
| | |
|---|---|
| *G06F 15/173* | (2006.01) |
| *G06F 15/177* | (2006.01) |
| *G06F 9/50* | (2006.01) |
| *H04L 29/06* | (2006.01) |
| *G06F 15/16* | (2006.01) |

(52) U.S. Cl.
CPC ............ *G06F 9/5072* (2013.01); *G06F 15/161* (2013.01); *H04L 63/0272* (2013.01)

(58) Field of Classification Search
CPC .......................... G06F 9/5072; H04L 63/0272
USPC ........................ 709/220–226; 370/310–310.2
See application file for complete search history.

(56) References Cited

U.S. PATENT DOCUMENTS

| | | | |
|---|---|---|---|
| 8,528,101 B1 * | 9/2013 | Miller et al. ................... 726/26 |
| 2003/0028577 A1 | 2/2003 | Dorland et al. | |
| 2004/0015891 A1 | 1/2004 | Arellano-Payne et al. | |
| 2005/0021548 A1 | 1/2005 | Bohannon et al. | |
| 2005/0086584 A1 | 4/2005 | Sampathkumar et al. | |
| 2005/0150953 A1 | 7/2005 | Alleshouse | |
| 2006/0095960 A1 | 5/2006 | Arregoces et al. | |
| 2011/0289329 A1 | 11/2011 | Bose et al. | |
| 2012/0131173 A1 | 5/2012 | Ferris et al. | |
| 2012/0151025 A1 | 6/2012 | Bailey et al. | |
| 2012/0185624 A1 | 7/2012 | Dang et al. | |
| 2012/0222106 A1 * | 8/2012 | Kuehl ............................. 726/11 |
| 2012/0250682 A1 * | 10/2012 | Vincent et al. ................. 370/390 |
| 2012/0287931 A1 * | 11/2012 | Kidambi et al. ............... 370/392 |
| 2013/0018994 A1 * | 1/2013 | Flavel et al. ................... 709/220 |
| 2013/0061306 A1 * | 3/2013 | Sinn ................................ 726/7 |
| 2013/0067090 A1 * | 3/2013 | Batrouni et al. ............... 709/226 |
| 2013/0067550 A1 * | 3/2013 | Chen et al. ......................... 726/7 |
| 2013/0085989 A1 | 4/2013 | Nayyar et al. | |
| 2013/0086236 A1 * | 4/2013 | Baucke et al. ................. 709/223 |
| 2013/0091241 A1 | 4/2013 | Goetz et al. | |
| 2013/0097304 A1 * | 4/2013 | Asthana et al. ................ 709/224 |
| 2013/0103844 A1 * | 4/2013 | Bulut et al. .................... 709/228 |

(Continued)

OTHER PUBLICATIONS

RackSolutions, Portable Server Rack, 2 pages, Jul. 31, 2010.*
Mell et al., "Draft NIST Working Definition of 'Cloud Computing'", Oct. 7, 2009.

(Continued)

*Primary Examiner* — Hieu Hoang
(74) *Attorney, Agent, or Firm* — Thompson Coburn LLP

(57) ABSTRACT

The present invention is a transportable private cloud computing platform, having a rack, several servers, a system management server, an interface device, a network switch, a power supply circuit, and a transit case. The present invention also includes a method for initializing the transportable private cloud computing platform, and a method for migrating software applications to the transportable private cloud computing platform.

10 Claims, 15 Drawing Sheets

(56) References Cited

U.S. PATENT DOCUMENTS

2013/0151980 A1\* 6/2013 Lee et al. .................. 715/738
2013/0346839 A1 12/2013 Dinha

OTHER PUBLICATIONS

International Search Report and Written Opinion for International Patent Application No. PCT/US2013/020726 dated May 14, 2013.

\* cited by examiner

|      | Example Software Components |
| ---- | --------------------------- |
| 1201 | Graphical User Interface    |
| 1202 | VMware vSphere              |
| 1203 | VMware vDirector            |
| 1204 | VMware vCenter              |
| 1205 | CA AppLogic                 |
| 1206 | EM7 System Management       |
| 1207 | Ni2                         |
| 1208 | CA RSI                      |

FIG. 12

TRANSPORTABLE PRIVATE CLOUD COMPUTING PLATFORM AND ASSOCIATED METHOD OF USE

FIELD OF INVENTION

The present invention relates generally to cloud computing, and in particular to system administrator assisted creation, operation, and management of a private cloud on a transportable private cloud computing platform.

BACKGROUND OF THE INVENTION

Cloud computing is the delivery of computing as a service rather than a product, whereby resources, software, and information are provided to computers and other devices as a utility over a network. Typically, cloud computing services are offered by cloud computing service providers on a pay-per-usage basis. Cloud computing has evolved into multiple deployment models, including public clouds, community clouds, and private clouds. A "public cloud" is a model where a service provider makes resources, such as software applications and storage, available to the general public. A "community cloud" shares infrastructure between several organizations from a specific community with common concerns. A "community cloud" may be hosted by a third party or hosted internally or externally by the specific community. A "private cloud" is infrastructure operated solely for a single organization or restricted group of users. A "private cloud" may be hosted by a third party or hosted internally or externally by the specific community whether managed internally or by a third-party and hosted internally or externally by the single organization or restricted group of users.

There are a number of challenges associated with relying on a public or community cloud computing environment. First, data governance is hindered by the use of public or community cloud computing providers that may or may not guarantee the safety and security of data stored in the provider's cloud. Second, public or community cloud computing providers lack resource management capabilities which allow a system administrator to scale resource utilization based on server load and software application usage. Third, network latency associated with using a public or community cloud computing environment may make the cloud sluggish and cumbersome. Fourth, system administrators may find themselves at the mercy of a public or community cloud computing provider because of poor reliability or low availability. Finally, there remains the looming issue of security on the virtual servers that make up the public or community environments. For these reasons, a system administrator is well-advised to seek a private cloud solution in an attempt to overcome some or all of these challenges associated with relying on a public or community cloud computing environment.

The creation of a private cloud solution requires a knowledge set not normally available to the average system administrator. The implementation process may be a timely and frustrating process replete with opportunities for making mistakes or introduction of errors, which will terminate the process or lead to a less that optimal cloud instance. For these reasons, a method of initializing a transportable private cloud computing platform is desirable.

Once a private cloud solution has been created, system administrators need the capability of migrating software applications to the cloud in order to make use of the available cloud resources. Traditionally, a system administrator takes inventory of local software applications and selects candidates for migration to the cloud. For these reasons, a method of migrating software applications to a transportable private cloud computing platform is desirable.

A typical cloud computing environment is established within the confines of a server room, data warehouse, or other similar physical structure within a cloud computing facility. In the event of a natural disaster, these cloud computing environments are vulnerable to degraded performance and even total loss. It is common practice for a host of a cloud computing environment to engage in contingency planning, which may consist of full-scale disaster recovery, failover capabilities, and system redundancy. A problem with this type of planning is the requirement of a full-scale or nearly full-scale replica of the cloud computing environment in a different location. A mobile cloud computing platform is desirable to reduce or eliminate the need for a full-scale replica of a cloud computing environment in case of natural disaster or other interruption of service at the primary cloud computing facility. In the event of an imminent natural disaster, the mobile cloud computing platform may be relocated to avoid an interruption in service.

It may also be desirable to create a cloud computing environment in a remote or inhospitable location. Traditional cloud computing service providers would be inadequate due to lack of network connectivity and network latency. A mobile cloud computing platform could be deployed to such a location and a private cloud environment could be instantiated to provide cloud services to a limited geographic area.

The present invention is directed to overcoming one or more of the problems set forth above.

SUMMARY OF THE INVENTION

This section provides a general summary of the disclosure, and is not a comprehensive disclosure of its full scope or all of its features. The present invention is directed at a transportable private cloud computing platform.

An aspect of this invention provides a transportable private cloud computing platform, that includes at least one rack with sufficient storage capacity to hold hardware components necessary to run a private cloud instance, at least two servers mounted on the rack that are capable of hosting private cloud operating systems, software applications and data storage, wherein the at least one of the at least two servers includes a system management server that utilizes system management software for managing the physical resources, the virtual server instances, and the software, an interface device that allows a system administrator to interact with the private cloud instance and the interface device provides guidance to the system administrator to create and administer a fully configured and operational private cloud that is connected to the at least two servers, at least one network switch mounted on the rack, and a power supply circuit capable of distributing power to the at least two servers, the interface device and the at least one network switch.

Another aspect of this invention provides a method of initializing a transportable private cloud computing platform, which includes applying power to a power supply circuit of a transportable private cloud computing platform, which also includes a rack, an interface device, at least two servers, at least one cloud computing operating system, and at least one network switch, activating a graphical user interface on the interface device, utilizing the interface device to provide queries to the system administrator so that a particular cloud computing operating system may be selected from the at least one cloud computing operating systems, starting the selected cloud computing operating system that operates as a private cloud, utilizing the interface device to request required keys from a system administrator, initiating a cloud operating system virtualizer, utilizing the interface device to allow a system administrator to enter the IP range of addresses, each of the IP addresses representing one of the at least two servers, to be integrated into the private cloud, locating and initializing, if not already initialized, each system administrator-selected server with the selected cloud computing operating system, incorporating the physical resources of each server of the at least two servers into the private cloud, utilizing the interface device to provide queries to the system administrator so that virtual server information is entered, and then creating the virtual servers.

Another aspect of this invention provides a method of migrating software applications to a transportable private cloud computing platform, which includes utilizing an interface device to allow a system administrator to invoke a software application migration system, searching for software applications that are available to be migrated to the private cloud computing platform, presenting a list of software applications that are available to be migrated to the private cloud computing platform, selecting an software application from the list of software applications that are available to be migrated to the private cloud computing platform, the selected software application becoming the migrating software application, resourcing the correct virtual server configuration on the private cloud computing platform to accommodate the migrating software application, migrating the software application to the private cloud computing platform; and migrating any software application data of the migrating software application to the private cloud computing platform, where the private cloud computing platform is transportable.

These are merely some of the innumerable aspects of the present invention and should not be deemed an all-inclusive listing of the innumerable aspects associated with the present invention. These and other aspects will become apparent to those skilled in the art in light of the following disclosure and accompanying drawings. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure. For a better understanding of the present invention, reference may be made to the accompanying drawings in which:

FIG. 12 shows a table with representative software components of a transportable private cloud computing platform in accordance with the present invention;

Figure 1:
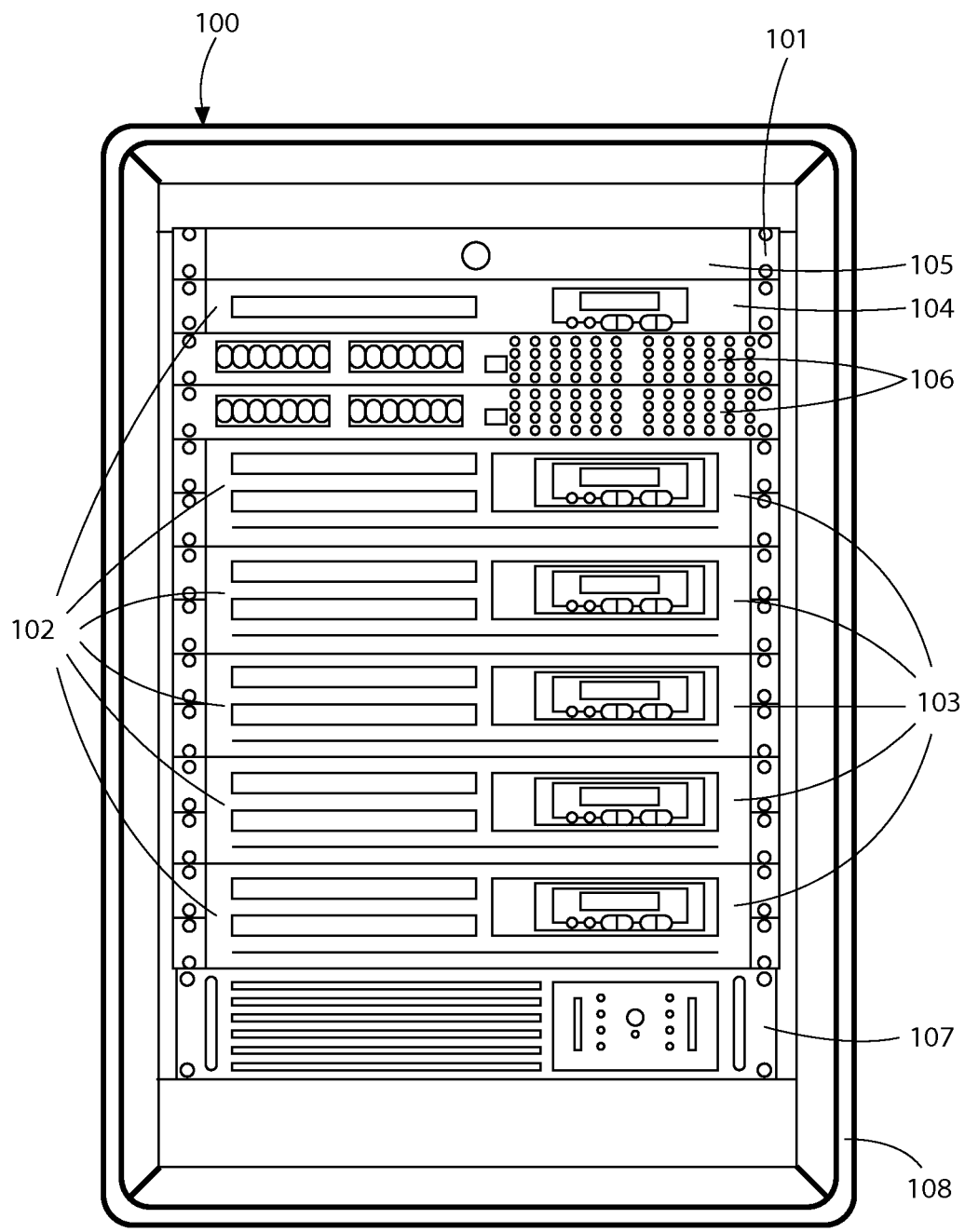
FIG. 1 is a front elevational view of a preferred illustrative, but nonlimiting, embodiment of a transportable private cloud computing platform in accordance with the present invention.

Reference characters in the written specification indicate corresponding items shown throughout the drawing figures.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components, e.g., devices, have not been described in detail so as to obscure the present invention.

The following list of definitions are provided in order to ensure a consistent understanding of terms used throughout this disclosure: a "system administrator" is a person who interfaces with the transportable private cloud computing platform to instantiate and configure a private cloud computing environment as well as manage and maintain the resources of the private cloud; a "user" is a person or entity that connects to the transportable private cloud computing platform and utilize cloud computing resources; "ruggedized" means that the unit is designed with protection against rough use or rough environments; and "transportable" means movable as a singular unit.

An illustrative, but nonlimiting, embodiment of a transportable private cloud computing platform in accordance with the principles of this invention is indicated generally as 100 in FIG. 1. The transportable private cloud computing platform 100 has at least one rack 101 with sufficient storage capacity to hold the hardware components or devices necessary to run a private cloud instance, as described below. In the illustrative, but nonlimiting, embodiment shown in FIG. 1, the at least one rack 101 is a sixteen (16) RU rack. The at least one rack 101 is mounted in a removably attached transit case 108. The transportable private cloud computing platform 100 has a plurality of servers 102 mounted on the at least one rack 101 and capable of hosting private cloud operating systems, software applications and data storage.

In the illustrative, but nonlimiting, embodiment shown in FIG. 1, the plurality of servers 102 is comprised of six (6) servers. Five (5) of the plurality of servers 102 are 2U x86 servers 103 with dual socket motherboards. Each of the 2U x86 servers 103 has two (2) CPUs with a minimum of twelve (12) cores, a minimum of One Hundred and Twenty-eight (128) Gigabyte (GB) of memory, at least eight (8) terabyte (TB) of attached storage, and at least two (2) Bb Network Interface Cards (NICs). In the transportable private cloud computing platform 100, at least one of a number of servers 102 is a system management server 104 that utilizes system management software for managing any physical resources, any virtual server instances, and any software applications of the transportable private cloud computing platform 100. In the illustrative, but nonlimiting, embodiment shown in FIG. 1, a system management server 104 is a 1U server with a single two-core CPU, at least eight gigabyte (GB) of memory, at least 500 gigabyte (GB) of storage and at least two one (1) gigabyte (Gb) Network Interface Cards (NICs).

The transportable private cloud computing platform 100 has an interface device 105 mounted on the at least one rack 101 that allows a system administrator to interact with the private cloud instance and the interface device provides guidance to the system administrator to create and administer a fully configured and operational private cloud. The interface device 105 may also be referred to as an "interface component" in some embodiments. In the illustrative, but nonlimiting, embodiment shown in FIG. 1, the interface device 105 has a combination keyboard, video, and mouse (KVM) switch which is used, in conjunction with an attached keyboard, video, and mouse, to facilitate input and output between the transportable private cloud computing platform 100 and a system administrator via a graphical user interface (GUI). The transportable private cloud computing platform 100 has at least one network switch 106 mounted on the at least one rack 101. In the illustrative, but nonlimiting, embodiment shown in FIG. 1, the at least one network switch 106 may include two twelve (12) port or twenty-four (24) port Gigabit Ethernet Switches with 10 Gigabit up-links. The transportable private cloud computing platform 100 has a power supply circuit 107 capable of distributing power to the components of the private cloud. In the illustrative, but nonlimiting, embodiment shown in FIG. 1, the power supply circuit 107 is a UPS.

A key aspect of the transportable private cloud computing platform 100 is that all of the enumerated components and/or devices necessary to create a private cloud instance are bundled into a singular unit, and that singular unit is transportable. The "transportable" aspect of the transportable private cloud computing platform 100 is that it be movable as a singular unit. For example, it is not necessary to strip the components and/or devices from the at least one rack 101 or remove the rack from the removably attached transit case 108 before moving the transportable private cloud computing platform 100.

Figure 2:
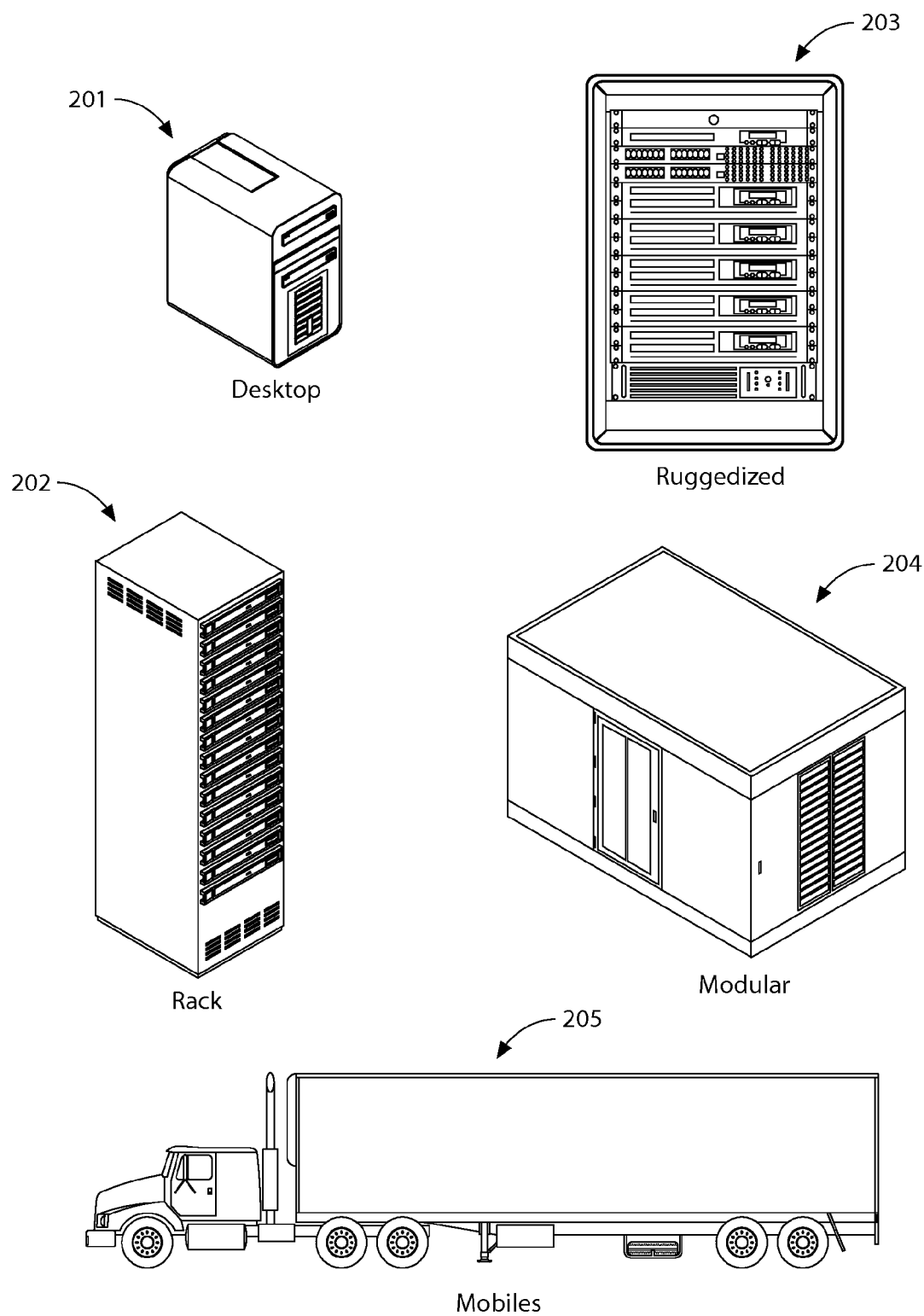
FIG. 2 shows multiple views of preferred illustrative, but nonlimiting, embodiments of a transportable private cloud computing platform in accordance with the present invention.

The transportable private cloud computing platform 100 may take on many forms and configurations. The prime mover of the transportable private cloud computing platform 100 may vary as shown in FIG. 2. FIG. 2 shows several different preferred illustrative, but nonlimiting, embodiments of the transportable private cloud computing platform 100. The desktop transportable private cloud computing platform 201 is sufficiently small and lightweight that a person could transport it. The rack transportable private cloud computing platform 202 has much greater capacity than the desktop transportable private cloud computing platform 201. The ruggedized transportable private cloud computing platform 203 is a more durable solution designed to withstand outdoor conditions. The modular transportable private cloud computing platform 204 is designed to be moved in much the same way that a shipping container would be moved, deployed in an outdoor environment, and fit in a parking space. The mobile transportable private cloud computing platform 205 is designed to be moved by a transport truck or similar vehicle.

The transportable private cloud computing platform 100 provides one or more private cloud instances. The transportable private cloud computing platform 100 provides the infrastructure necessary to operate one or more private clouds for a single organization or restricted group of users. As such, the transportable private cloud computing platform 100 will have access controls in place to restrict access to the private cloud to a limited number of users.

The transportable private cloud computing platform 100 is a computing platform, meaning that it has the hardware architecture and a software framework necessary to instantiate and run at least one private cloud instance. The specific form of the hardware architecture and software framework of a transportable private cloud computing platform 100 may vary, as described in the following paragraphs.

The rack 101, where there is at least one rack, may take on many forms, as the form of the rack 101, by itself, is not a central feature of this invention. In FIG. 1, the rack 101 is a 16 RU rack. The desktop transportable private cloud computing platform 201 will contain a small rack, which is a small form-factor rack with enough capacity to host the essential elements of the transportable private cloud computing platform 100. The modular transportable private cloud computing platform 204 and mobile transportable private cloud computing platform 205 may contain a rack or racks of much greater form factor.

Figure 3:
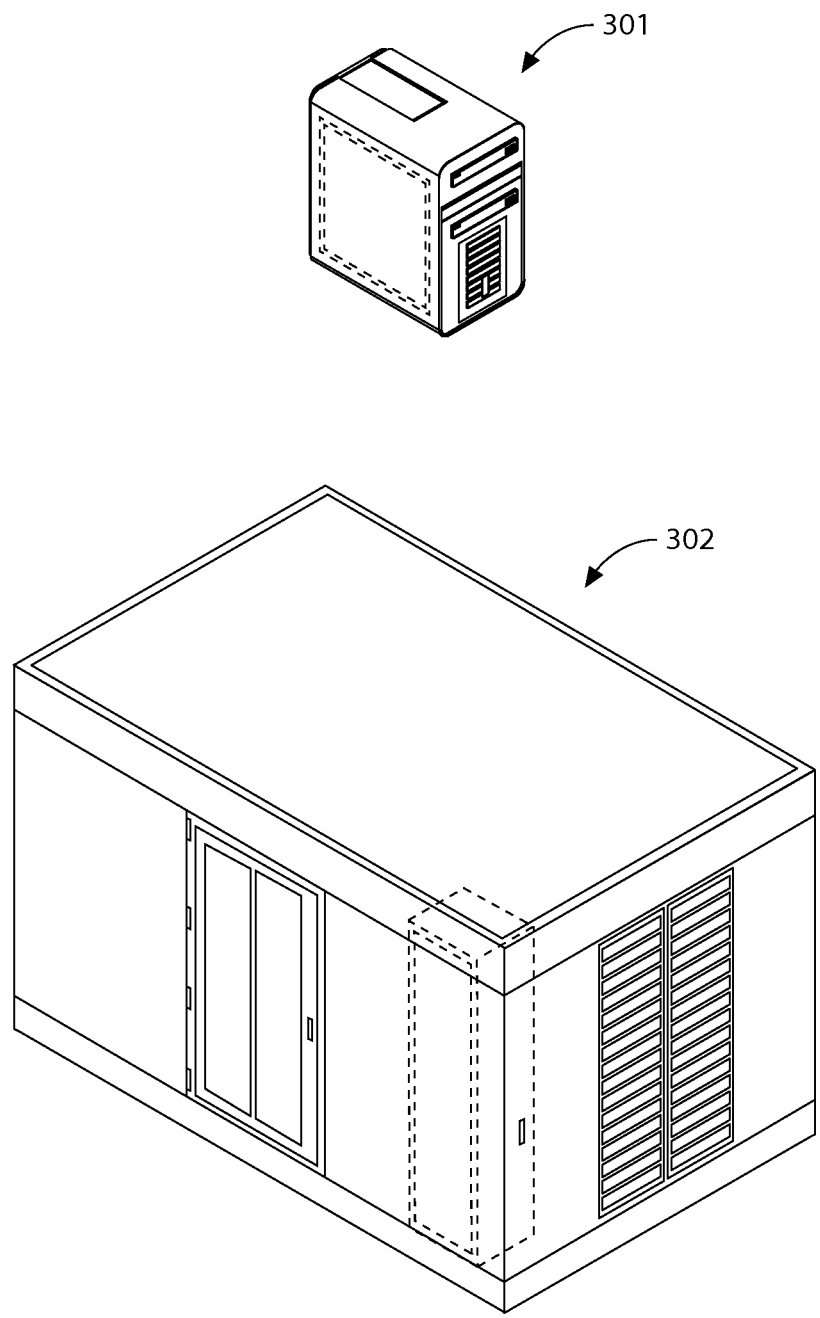
FIG. 3 shows two different rack sizes for a transportable private cloud computing platform in accordance with the present invention.
Figure 4:
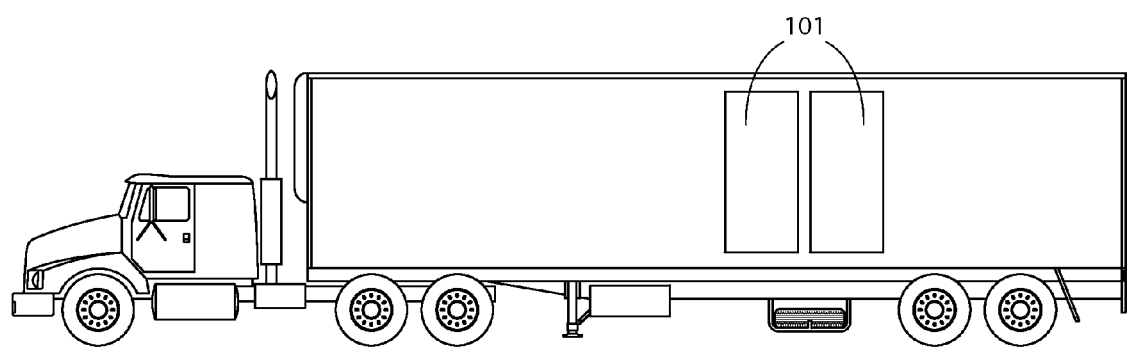
FIG. 4 shows two adjoining racks in one transportable private cloud computing platform in accordance with the present invention.

FIG. 3 illustrates a small form factor rack 301 embodied in the desktop transportable private cloud computing platform 201. A large form factor rack 302 is embodied in the modular transportable private cloud computing platform 204. Referring now to FIG. 4, the at least one rack 101 is embodied in two large form factor racks 302 staged side-by-side inside the mobile transportable private cloud computing platform 205. If the at least one rack 101 consists of more than one rack, the arrangement of the racks may vary.

The plurality of servers 102 may take on many forms, as the form of the number of servers 102, by themselves, are not a central feature of this invention. The only requirement is that the plurality of servers 102 be capable of hosting private cloud operating systems, software applications, and data storage. As private cloud operating systems and software applications continue to evolve, data storage needs continue to increase, and server technology advances, it is envisioned that the servers making up the plurality of servers 102 will be upgraded or swapped out. The servers making up the plurality of servers 102 will take on greater processing capacity, greater processing speed, greater random access memory (RAM), greater storage, improved network interface cards (NICs), and other improvements.

The system management server 104 could be any of the plurality of servers 102. The system management server 104 provides the cloud management software tools and resources for a system administrator to manage the resources of the transportable private cloud computing platform 100.

Figure 5:
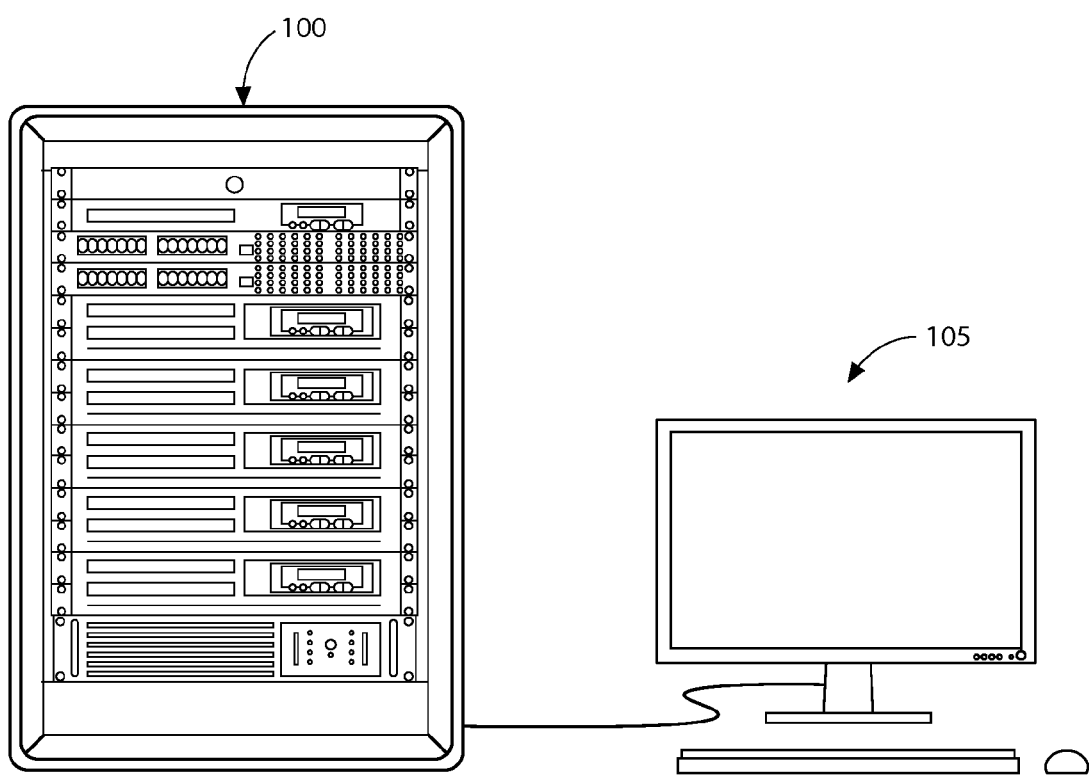
FIG. 5 shows an interface device in accordance with the present invention.

The interface device 105 may also take on many forms. The interface device 105 is the mechanism by which the system administrator interacts with the transportable private cloud computing platform 100. The interface device 105 requires software and physical elements to facilitate input and output between a system administrator and the transportable private cloud computing platform 100. The interface device 105 shown in FIG. 1 is a KVM, but the particular software used to manage virtual servers may change over time. The interface device 105 has a graphical user interface (GUI), which is intended to provide step-by-step guidance to enable a novice system administrator with no cloud technical experience to initialize, configure, and manage a private cloud computing environment. The graphical user interface (GUI) of the interface device 105 may run on any of the plurality of servers 102, but most likely it runs on the system management server 104. In addition, the system management server 104 may run both system management software and interface device 105 software. The graphical user interface (GUI) for the system management server 104 may be the same graphical user interface (GUI) that is used for the interface device 105. It is expected that a system administrator will plug in a keyboard, video monitor, and mouse to the interface device 105 as shown in FIG. 5.

The at least one network switch 106 may also take on many forms, as the form of the at least one network switch 106 is not a central feature of this invention. It is envisioned that the at least one network switch 106 may be upgraded or swapped out at any time better technology is available.

The power supply circuit 107 may also take on many forms. In a preferred illustrative, but nonlimiting, embodiment, the power supply circuit 107 is an uninterruptable power supply. In another illustrative, but nonlimiting, embodiment, the power supply circuit is standard 110-volt alternating current (AC) circuit fed through a standard power cord. In another illustrative, but nonlimiting, embodiment, there are several redundant 110-volt alternating current (AC) plugs and one of several redundant rectifier units convert the power to forty-eight (48) volts direct current (DC). The direct current (DC) voltage is desirable because it is more efficient, increases the reliability of the server, and cuts down on the noise because the fans and heat sinks may be eliminated. In yet another illustrative, but nonlimiting, embodiment, power is supplied by a generator. It is envisioned that any voltage-producing source may be used to supply power to the transportable private cloud computing platform 100.

In any of the illustrative, but nonlimiting, embodiments of the transportable private cloud computing platform 100, and illustrated in FIG. 2, the transportable private cloud computing platform 100 has a removably attached transit case 108 over the at least one rack 101 to protect the interior components. The removably attached transit case 108 could be made of any material and be any shape so long as it is capable of protecting the interior components and allowing the transportable private cloud computing platform 100 to function properly. The removably attached transit case 108 may be a hardened transit case. The hardened transit case may be made of metal, plastic, or any other hardened material. In some illustrative, but nonlimiting, embodiments, the removably attached transit case 108 is waterproof and/or water-resistant. In some illustrative, but nonlimiting, embodiments, the removably attached transit case 108 is heat-resistant and/or fire-resistant. The removably attached transit case 108 should cover the top and sides of the transportable private cloud computing platform 100. The transit case does not necessarily need to cover the front, back, or bottom of the transportable private cloud computing platform 100, though it could. The removably attached transit case 108 may be comprised of several components, where all the components and/or devices are attached to the transportable private cloud computing platform 100 to protect it during transport. The removably attached transit case 108 may have openings for ventilation or for attachment of external components and/or devices such as a power cord or keyboard.

Figure 6:
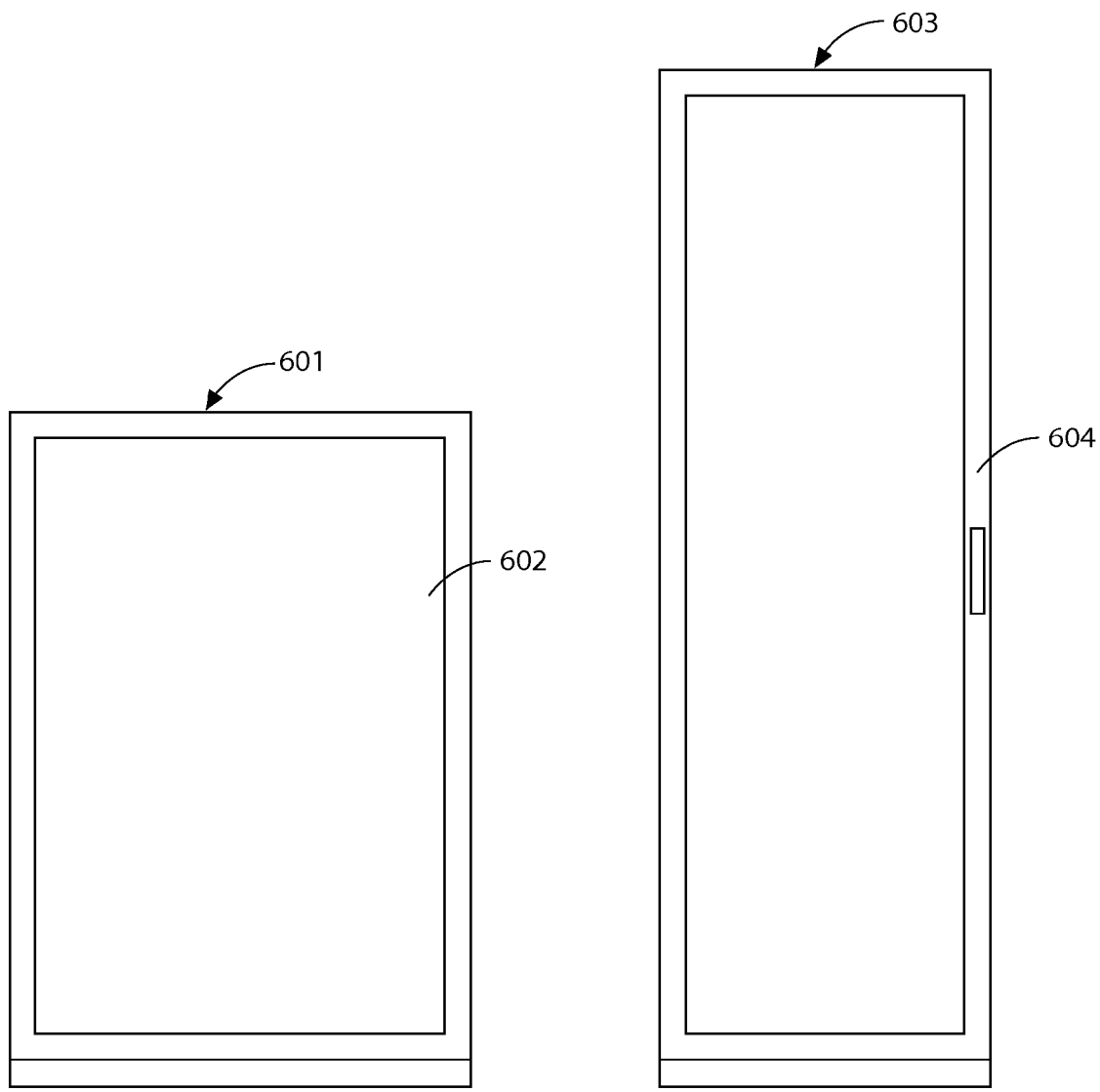
FIG. 6 shows several transit cases in accordance with the present invention.

In FIG. 6, an illustrative, but nonlimiting, embodiment of the removably attached transit case 108 is a plastic hardened transit case 601. In some illustrative, but nonlimiting, embodiments, the plastic hardened transit case 601 has a removable front cover 602, which may be detached at any time. In another illustrative, but nonlimiting, embodiment, the removably attached transit case 108 is a metal hardened transit case 603. In some illustrative, but nonlimiting, embodiments, the metal hardened transit case 603 has an entry door 604.

In an illustrative, but nonlimiting, embodiment, the transportable private cloud computing platform 100 is ruggedized, as shown in FIG. 2. The ruggedized transportable private cloud computing platform 203 is designed specifically to withstand outdoor conditions, but the other illustrative, but nonlimiting, embodiments shown in FIG. 2 may be modified to be ruggedized as well. A transportable private cloud computing platform 100 that has been ruggedized has some additional feature, added as protection, to allow it to withstand rough handling or rough environments. The additional feature added to a transportable private cloud computing platform 100 to make it ruggedized may be waterproofing, water resistance, padding, durable components, or a variety of other features that add protection. In some illustrative, but nonlimiting, embodiments, the additional ruggedizing feature is a plurality of servers 102 that have been modified to withstand impacts and rough handling. In an illustrative, but nonlimiting, embodiment shown in FIG. 6, the transportable private cloud computing platform 100 has a plastic hardened transit case 601, which make is ruggedized.

Figure 7:
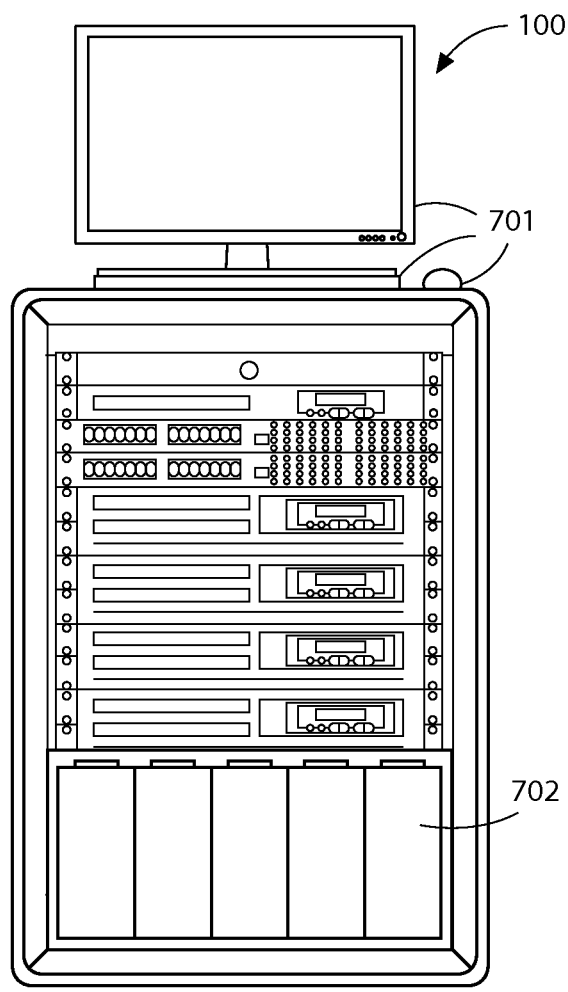
FIG. 7 shows a stand-alone transportable private cloud computing platform in accordance with the present invention.

In an illustrative, but nonlimiting, embodiment, the transportable private cloud computing platform 100 is a stand-alone unit. A "stand-alone unit" means that the transportable private cloud computing platform 100 has all of the components, software, and power supply needed to operate independently of any other systems. In this illustrative, but nonlimiting, embodiment, nothing is required to be attached or integrated with the transportable private cloud computing platform 100 in order for it to instantiate a private cloud. An input/output device for use by a system administrator may be built into the transportable private cloud computing platform 100. A power supply or a power generation means may be built into the transportable private cloud computing platform 100. FIG. 7 illustrates a transportable private cloud computing platform 100 with a built in keyboard, monitor, and mouse 701 and a battery pack 702.

Figure 8:
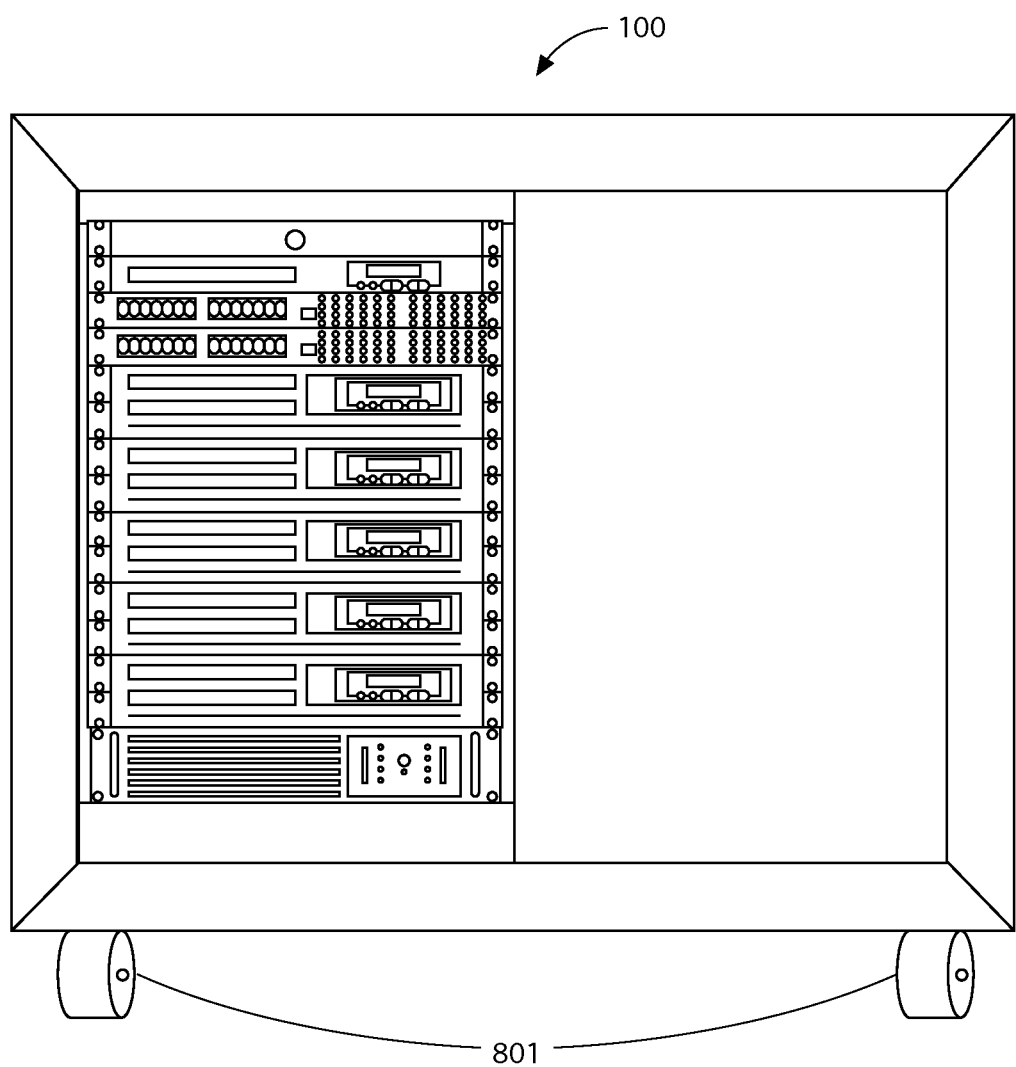
FIG. 8 shows a mobility mechanism in accordance with the present invention.

In an illustrative, but nonlimiting, embodiment, the transportable private cloud computing platform 100 has a removably attached mobility mechanism to allow for ease of mobility. An illustrative, but nonlimiting, embodiment of the mobility mechanism is shown in FIG. 8. The removably attached mobility mechanism, as shown in FIG. 8, is a set of four (4) wheels 801. The removably attached mobility mechanism could be in the form of four wheels 801, rollers, a tri-track chassis, an amphibious hull, or any other mechanism that will allow the transportable private cloud computing platform 100 to be moved without lifting.

Figure 9:
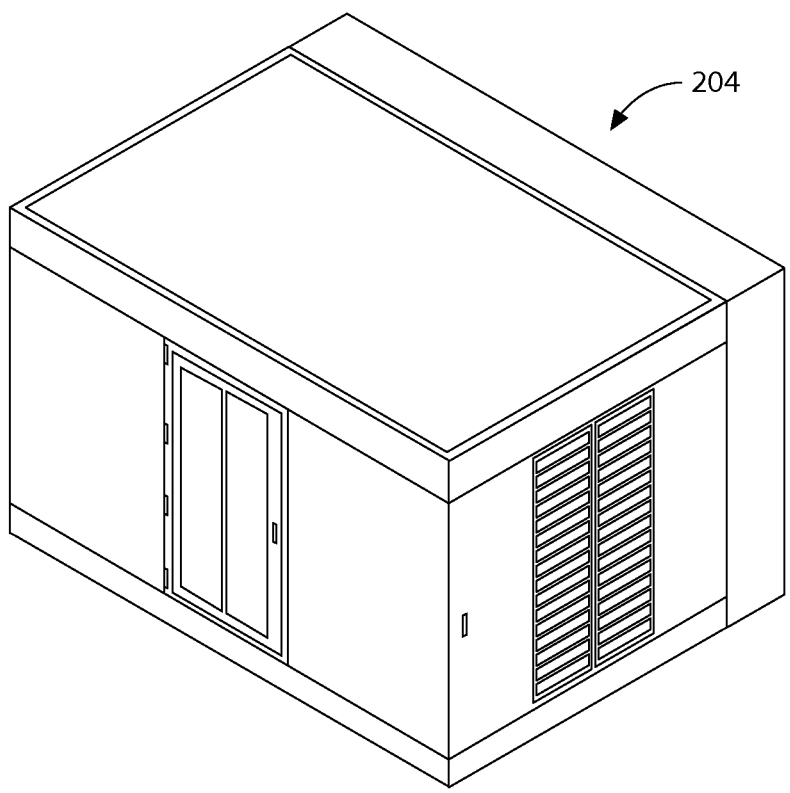
FIG. 9 shows a resizable removably attached transit case accordance with the present invention.

In a illustrative, but nonlimiting, embodiment, the transportable private cloud computing platform 100 has a resizable removably attached transit case 108, allowing for a larger or additional at least one rack 101. FIG. 9 illustrates a modular transportable private cloud computing platform 204 with an additional rack added. The advantage of having a resizable removably attached transit case 108 is to allow for easy scalability as computing needs change.

In an illustrative, but nonlimiting, embodiment, there is more than one private cloud instance running on a single transportable private cloud computing platform 100. It is envisioned that several of the embodiments illustrated in FIG. 2 will have more than one rack to form the at least one rack 101 of the single transportable private cloud computing platform 100, and each rack will have all the components and/or devices necessary to instantiate a separate private cloud instance. Shown in FIG. 10, a mobile transportable private cloud computing platform 205 is a transportable private cloud computing platform 100 running two private cloud instances 1001.

Figure 10:
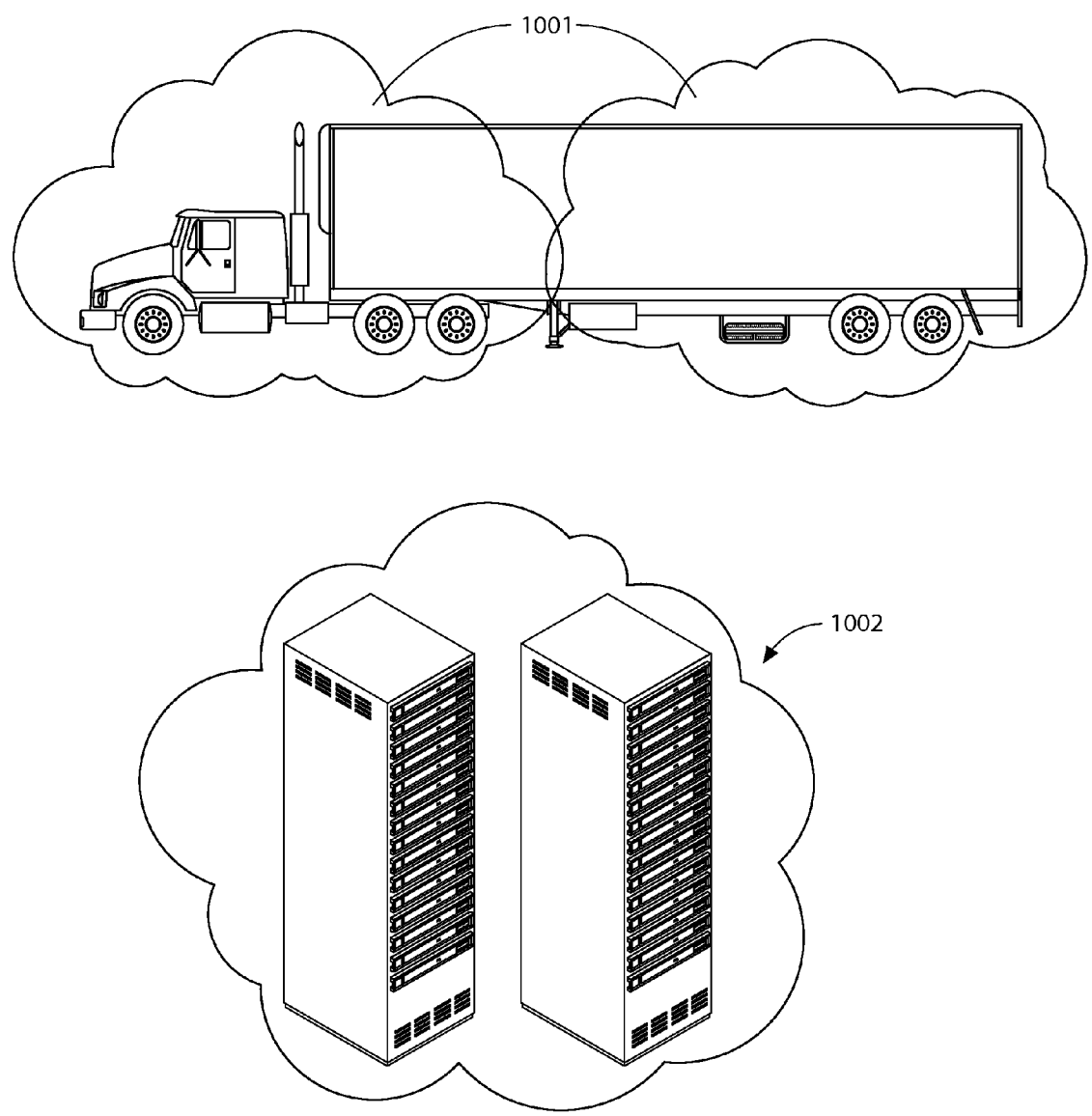
FIG. 10 shows various combinations of private cloud instances and transportable private cloud computing platforms in accordance with the present invention.

In another illustrative, but nonlimiting, embodiment, more than one transportable private cloud computing platform 100 may be joined to create a single private cloud instance. In FIG. 10, two rack transportable private cloud computing platforms 202 are joined to create a single private cloud instance 1002.

Figure 11:
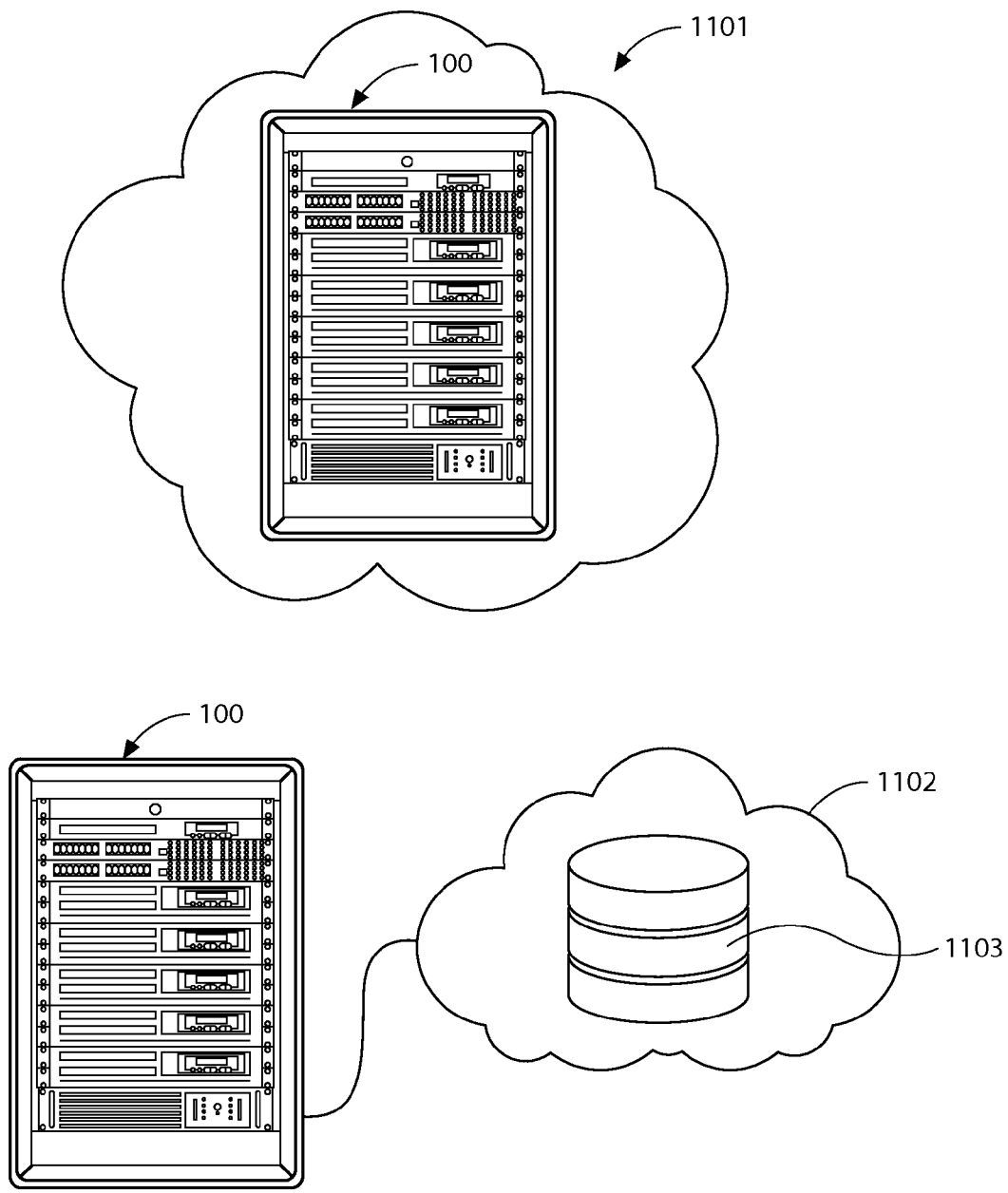
FIG. 11 shows a transportable private cloud computing platform with a wireless network and connected to a public cloud in accordance with the present invention.

In an illustrative, but nonlimiting, embodiment, the transportable private cloud computing platform 100 creates and maintains a wireless network. As shown in FIG. 11, a ruggedized transportable private cloud computing platform 203 has been deployed and maintains a secure wireless network 1101 to enable users to connect from anywhere within the range of the wireless network. It is envisioned that an antenna may be attached to a transportable private cloud computing platform 100 for additional range.

In an illustrative, but nonlimiting, embodiment, the transportable private cloud computing platform 100 is connected to a public or community cloud. The connection is limited so that the transportable private cloud computing platform 100 may exchange data with the public or community cloud, but is not part of the public or community cloud. In FIG. 11, a ruggedized transportable private cloud computing platform 203 has been deployed and is connected to a public cloud 1102 in order to query a database 1103 in the public cloud.

In order to be operational, the transportable private cloud computing platform 100 must have software installed to enable it to perform the functions of instantiating a private cloud, migrating software applications to the cloud, and managing cloud resources. FIG. 12 is a table of representative software components. Most, if not all, of these software components may be current off-the-shelf software (COTS). The graphical user interface (GUI) 1201 is a software component that, among other things, allows the system administrator to interact with the transportable private cloud computing platform 100. VMware vSphere 1202 is a software component that, among other things, allows a system administrator to create a private cloud instance. VMware vDirector 1203 is a software component that, among other things, allows a system administrator to manage infrastructure-as-a-service from the cloud. VMware vCenter 1204 is a software component that, among other things, allows a system administrator to manage virtualizations in the cloud. CA AppLogic 1205 is a software component that, among other things, allows a system administrator to integrate, monitor, and scale software applications and cloud infrastructure. EM7 System Management 1206 is a software component that, among other things, allows for cloud resource monitoring. Ni2 1207 is a software component that, among other things, allows the system administrator to build and maintain an inventory of all cloud physical and virtual resources. CA RSI 1208 is a software component that, among other things, implements user authentication. Not all of these software components are necessary to operate the transportable private cloud computing platform 100. The transportable private cloud computing platform 100 needs to have a GUI, and software to enable a system administrator to instantiate a private cloud.

Figure 13:
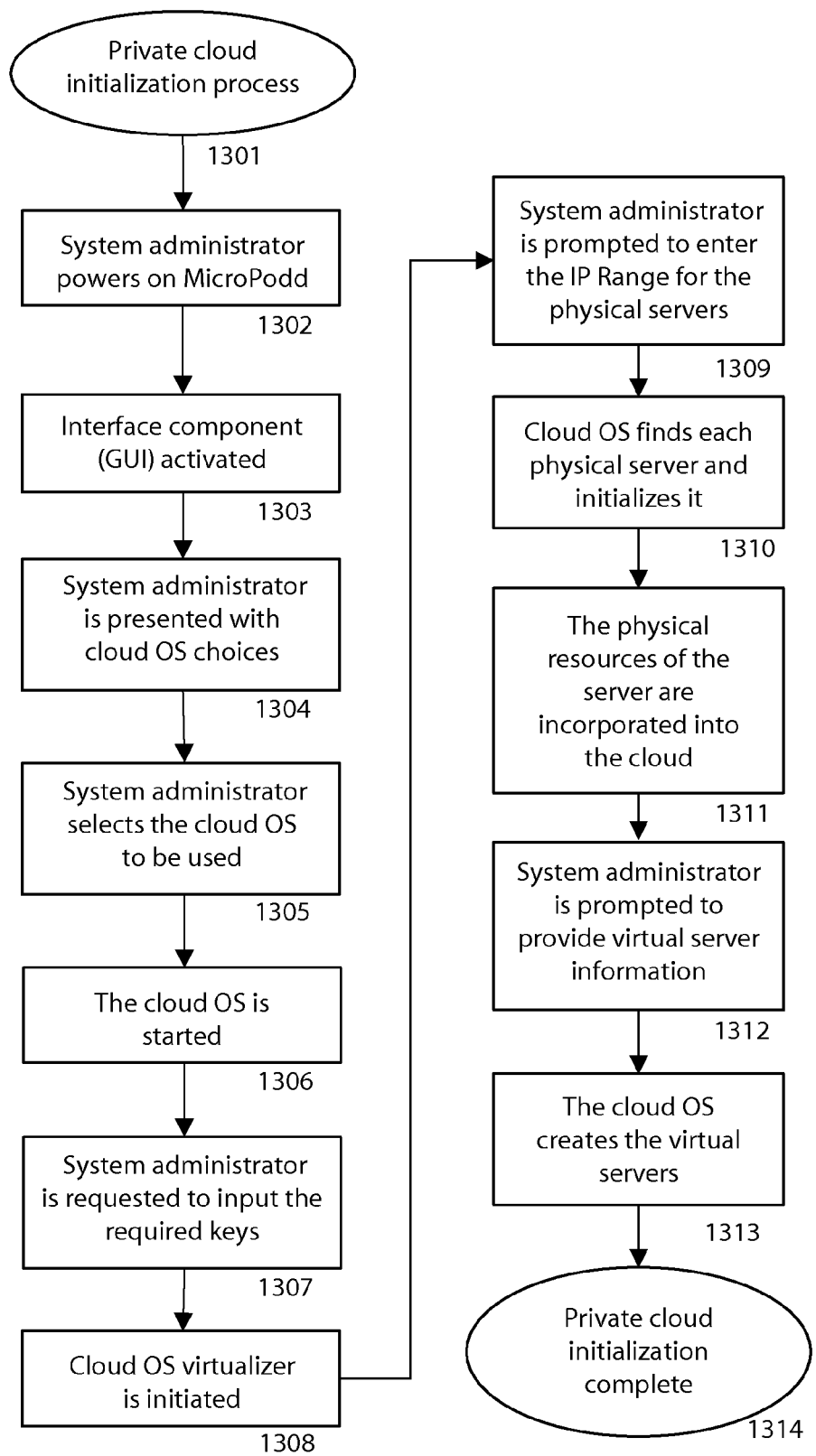
FIG. 13 shows a flow diagram of a private cloud initialization process in accordance with the present invention.

The methods of initializing the transportable private cloud computing platform 100 and migrating software applications to the transportable private cloud computing platform 100 will now be discussed with reference to the flowcharts in FIG. 13 and FIG. 14, respectively. In the description of the flowcharts, the functional explanation marked with numerals in angle brackets, <nnn>, will refer to the flowchart blocks bearing that number.

A feature of the transportable private cloud computing platform 100 is that the interface device 105 provides step-by-step guidance to enable a novice system administrator with no cloud technical experience to create a fully configured and operational private cloud, administer the cloud, allocate virtual servers and manage the private cloud. The method of initializing the transportable private cloud computing platform 100 is shown in FIG. 13. The process starts <1301> when the system administrator applies power to a power supply circuit 107 of the transportable private cloud computing platform 100 <1302>, which activates the graphical user interface (GUI) 1201 of the interface device 105 <1303>. The graphical user interface (GUI) 1201 presents the system administrator with a choice of cloud operating system and queries the system administrator for a choice <1304>. Once the system administrator chooses a cloud operating system <1305>, the operating system is started <1306> to create a private cloud instance.

The graphical user interface (GUI) 1201 then prompts the system administrator to input required keys <1307>, and the cloud operating system virtualizer is initiated <1308>. The graphical user interface (GUI) 1201 then prompts the system administrator to enter the IP range of the plurality of servers 102 <1309>, and the cloud operating system finds each of the plurality of servers 102 and initializes with the selected cloud computing operating system <1310>, if it hasn't already been initialized. The physical resources of each server of the plurality of servers 102 is then incorporated into the private cloud <1311>. The graphical user interface (GUI) 1201 then prompts the system administrator to provide virtual server information <1312>, and the cloud operating system creates the virtual servers <1313>. Once the virtual servers have been created, the method of initializing the transportable private cloud computing platform 100 is complete <1314>.

In an illustrative, but nonlimiting, embodiment of the method of initializing the transportable private cloud computing platform 100, the system administrator is required to authenticate after the graphical user interface (GUI) 1201 of the interface device 105 is activated. The system administrator must provide valid credentials before the graphical user interface (GUI) 1201 will present the system administrator with a choice of cloud operating systems.

In an illustrative, but nonlimiting, embodiment of the method of initializing the transportable private cloud computing platform 100, the system administrator is presented with a list of IP addresses, each of the IP addresses representing one of the plurality of servers, to be integrated into the private cloud.

In an illustrative, but nonlimiting, embodiment of the method of initializing the transportable private cloud computing platform 100, the system administrator is allowed to manually add or remove available transportable private cloud computing platform resources.

A feature of the transportable private cloud computing platform 100 is that the interface device 105 provides step-by-step automated assistance a novice system administrator in the execution of an automated assessment of a target physical server with running software applications to determine what configuration a virtual server will need to run the software application, establish a correctly configured virtual server instance, and migrate the physical server application to the virtual server instance. It is envisioned that the method of migrating software applications to the transportable private cloud computing platform 100 may be performed at any time after the transportable private cloud computing platform 100 has been initialized.

Figure 14:
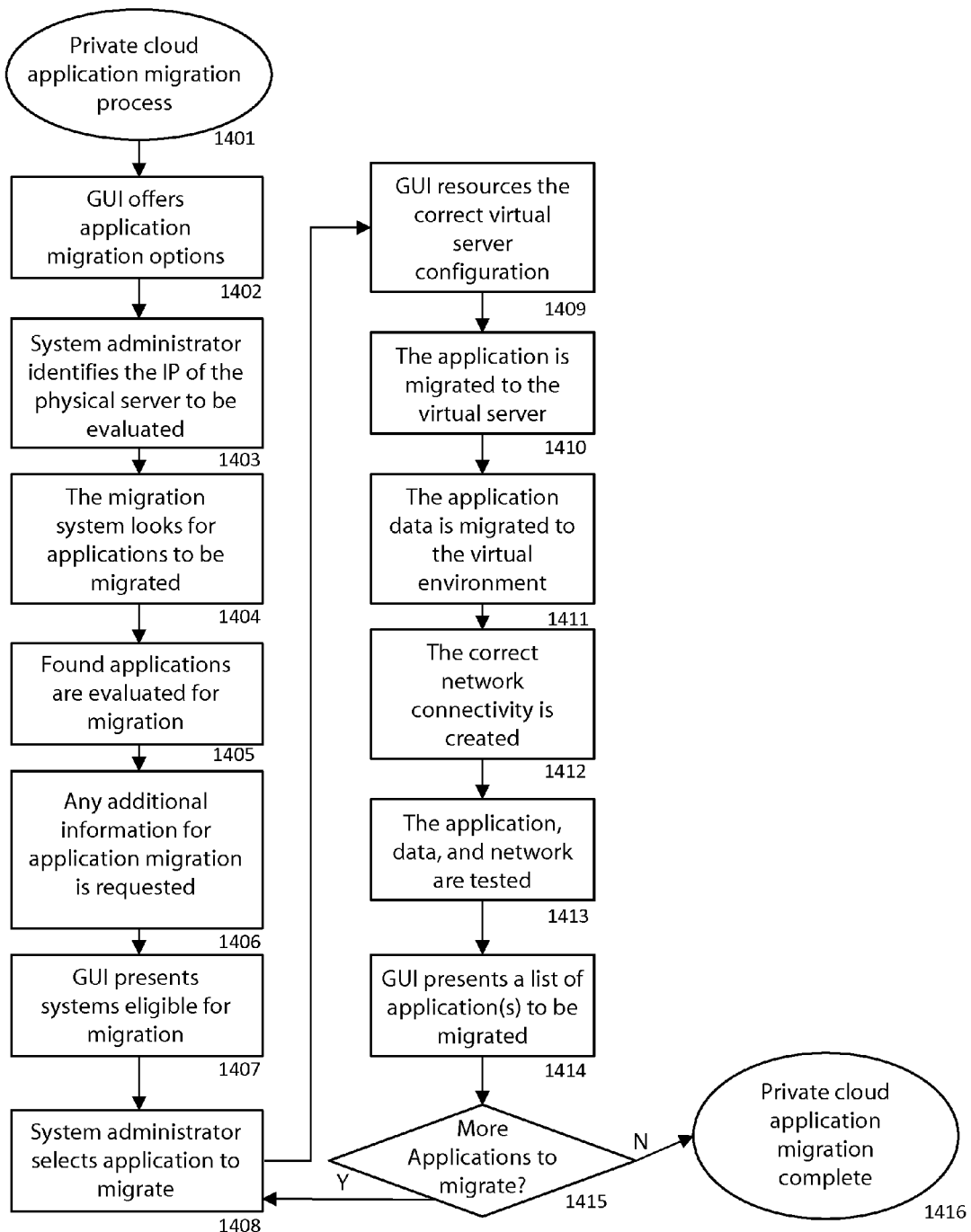
FIG. 14 shows a flow diagram of a private cloud software application migration process in accordance with the present invention.

The method of migrating software applications to the transportable private cloud computing platform 100 is shown in FIG. 14. The process starts <1401> when a system administrator utilizes the interface device 105 to invoke a software application migration system. The software application migration system is normally built into the graphical user interface (GUI) 1201, as part of the interface device 105, but it could be embodied in commercial off-the-shelf (COTS) software. The software application migration system offers software application migration options to the system administrator <1402>. The system administrator is guided by the software application migration system to search for software applications that are available to be migrated to the transportable private cloud computing platform 100. In particular, the system administrator may identify the IP address of a server to be evaluated <1403> for software applications to migrate.

However, the software application migration system may automatically search for and select a server for evaluation. Once the server has been identified, the software application migration system searches for software applications that are candidates for migration <1404>. The software application migration system evaluates each of these candidates for migration <1405>, and additional information may be queried from the system administrator <1406> to facilitate the evaluation process. The software application migration system presents a list of software applications that are available to be migrated <1407>, and the system administrator selects a software application from the list to be migrated to the transportable private cloud computing platform 100 <1408>. Once a software application is selected by the system administrator, the software application migration system resources the correct virtual server configuration <1409> on the transportable private cloud computing platform 100 to accommodate the migrating software application. The software application migration system then migrates the migrating software application to the transportable private cloud computing platform 100 <1410>. Finally, any software application data of the migrating software application is also migrated to the transportable private cloud computing platform 100 <1411>. This process may be repeated if there are more software applications to be migrated from the same server <1414>. In addition, this process may be repeated if there are more servers to evaluate for software applications to migrate <1415>. Once all desired servers have been evaluated and all desired software applications have been migrated from those servers, the method of migrating software applications to the transportable private cloud computing platform 100 is complete <1416>.

In an illustrative, but nonlimiting, embodiment, the final step is a test of the network connectivity <1412>, migrating software application, and any migrating software application data <1413>, before migration is complete. In another illustrative, but nonlimiting, embodiment, the software application migration system is fully automated and does not require human interaction with the interface device 105.

Figure 15:
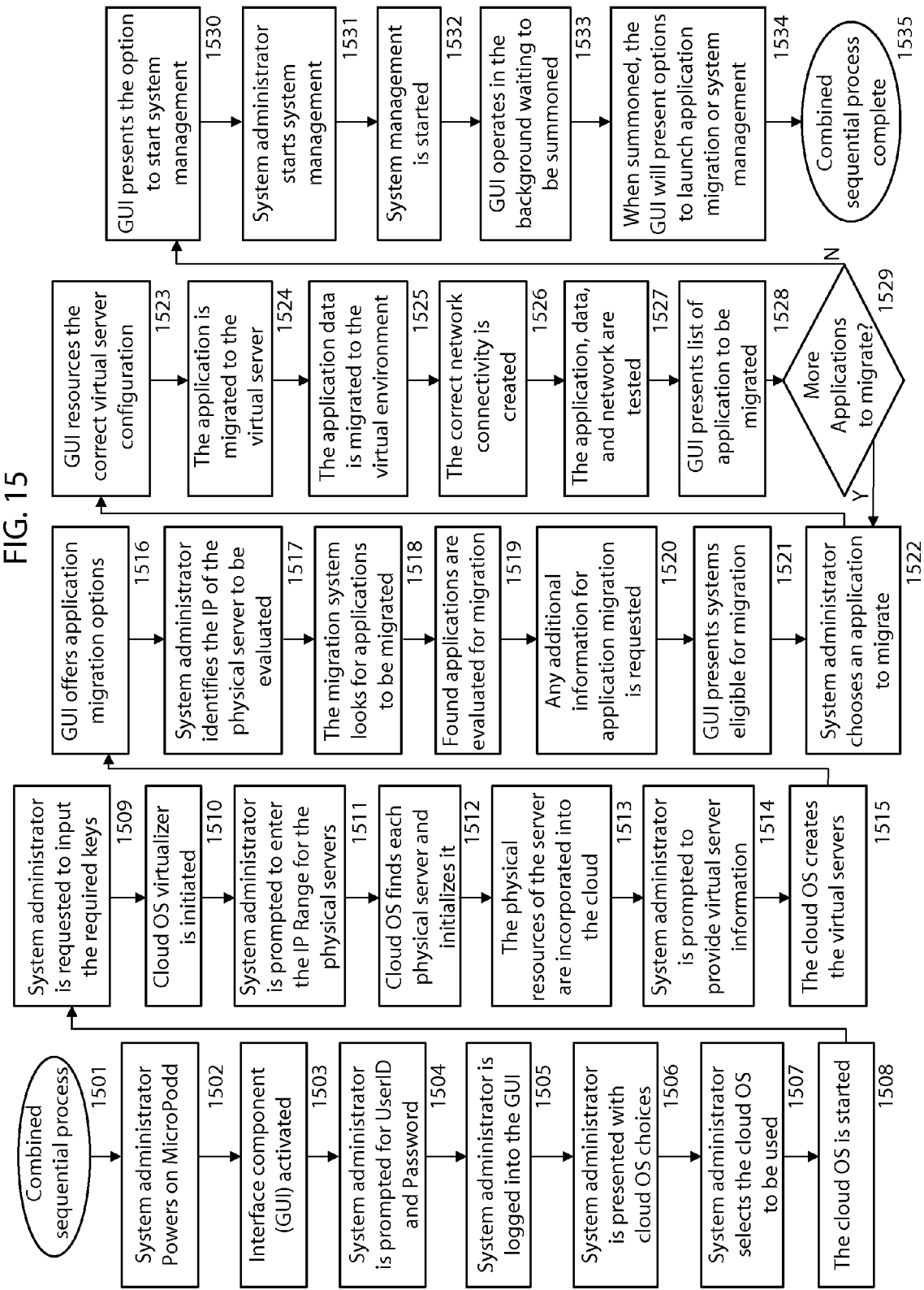
FIG. 15 shows a flow diagram of a private cloud combined sequential process in accordance with the present invention.

The method of initializing the transportable private cloud computing platform 100 and method of migrating software applications to the transportable private cloud computing platform 100 may be performed in sequence, as shown in FIG. 15. In FIG. 15, the method of initializing the transportable private cloud computing platform 100 is performed first, followed immediately by the method of migrating software applications to the transportable private cloud computing platform 100.

In an illustrative, but nonlimiting, embodiment as shown in FIG. 15, the method of initializing the transportable private cloud computing platform 100 and method of migrating software applications to the transportable private cloud computing platform 100 are performed in sequence. The combined sequential process starts <1501> when the system administrator applies power to a power supply circuit 107 of the transportable private cloud computing platform 100 <1502>, which activates the graphical user interface (GUI) 1201 of the interface device 105 <1503>. After the graphical user interface (GUI) 1201 of the interface device 105 is activated, the system administrator is prompted for a user ID and password <1504> for authentication. Once the system administrator enters a valid user ID and password, the system administrator is logged onto the graphical user interface (GUI) 1201 <1505>.

After the system administrator has logged onto the graphical user interface (GUI) 1201, the graphical user interface (GUI) 1201 presents the system administrator with a choice of cloud operating system and queries the system administrator for a choice <1506>. Once the system administrator chooses a cloud operating system <1507>, the operating system is started <1508> to create a private cloud instance.

The graphical user interface (GUI) 1201 then prompts the system administrator to input required keys <1509>, and the cloud operating system virtualizer is initiated <1510>. The graphical user interface (GUI) 1201 then prompts the system administrator to enter the IP range of the plurality of servers 102 <1511>, and the cloud operating system finds each of the plurality of servers 102 and initializes with the selected cloud computing operating system <1512>, if it hasn't already been initialized. The physical resources of each server of the plurality of servers 102 is then incorporated into the private cloud <1513>. The graphical user interface (GUI) 1201 then prompts the system administrator to provide virtual server information <1514>, and the cloud operating system creates the virtual servers <1515>. Once the virtual servers have been created, the method of initializing the transportable private cloud computing platform 100 is complete.

The system administrator may choose to immediately execute the method of migrating software applications to the transportable private cloud computing platform 100 after initialization. The second part of the combined sequential process shown in FIG. 15 begins when the system administrator utilizes the graphical user interface (GUI) 1201 to launch the application migration system. The software application migration system offers software application migration options to the system administrator <1516>. The system administrator is guided by the software application migration system to search for software applications that are available to be migrated to the transportable private cloud computing platform 100. In particular, the system administrator may identify the IP address of a server to be evaluated <1517> for software applications to migrate.

Once the server has been identified, the software application migration system searches for software applications that are candidates for migration <1518>. The software application migration system evaluates each of these candidates for migration <1519>, and additional information may be queried from the system administrator <1520> to facilitate the evaluation process. The software application migration system presents a list of software applications that are available to be migrated <1521>, and the system administrator selects a software application from the list to be migrated to the transportable private cloud computing platform 100 <1522>. Once a software application is selected by the system administrator, the software application migration system resources the correct virtual server configuration <1523> on the transportable private cloud computing platform 100 to accommodate the migrating software application. The software application migration system then migrates the migrating software application to the transportable private cloud computing platform 100 <1524>. Any software application data of the migrating software application is also migrated to the transportable private cloud computing platform 100 <1525>. The correct network connectivity is created <1526>. A test is conducted of the migrating software application, any migrating software application data, and the network <1527>, before migration is complete.

The graphical user interface (GUI) 1201 then presents a list of remaining applications that are candidates for migration <1528>. If the system administrator desires to migrate more applications from the list of available candidates <1529>, he selects them from the list <1522> and the process continues as described above. If the system administrator decides not to migrate more applications or if there are no more available candidate applications for migration <1529>, the method of migrating software applications to the transportable private cloud computing platform 100 is complete.

Finally, the graphical user interface (GUI) 1201 will present the system administrator with the option of starting a system management application <1530>. If the system administrator chooses to start the system management application <1531>, the system management application is initiated <1532>. The graphical user interface (GUI) 1201 is then sent to the background waiting to be summoned <1533>. When summoned, the graphical user interface (GUI) 1201 will present to the system administrator the options of launching the application migration system or launching the system management application <1534>. When the system administrator is finished migrating applications and adjusting physical resources, the combined sequential process is complete <1535>.

Operational Example 1

In an operation example of the transportable private cloud computing platform 100, a mobile transportable private cloud computing platform 205 is deployed at a coastal city by the Federal Emergency Management Agency (FEMA) the prior to the arrival of a major hurricane. In this example, the transportable private cloud computing platform 100 has a portable generator and fuel supply loaded on the trailer in addition to the racks, servers, and other equipment. As the city evacuates in advance of the arrival of the hurricane, a FEMA employee with little training in the field of cloud computing initializes the mobile transportable private cloud computing platform 205 by following the guidance of the interface device 105. Once the FEMA employee creates a private cloud instance on the mobile transportable private cloud computing platform 205, he is able to utilize the software application migration system to migrate software applications and data from the FEMA command center. At this point, the mobile transportable private cloud computing platform 205 is operating as a redundant system, capable of serving as a fail-over system should the FEMA command center become inoperable. The mobile transportable private cloud computing platform 205 creates a wireless network, so it operates as a stand-alone unit.

Just prior to the arrival of the hurricane, the mobile transportable private cloud computing platform 205 is relocated to a safe location out of the path of the hurricane. As the mobile transportable private cloud computing platform 205 moves down the highway, it is fully operational because it has an internal power supply and is connected to the FEMA command center through the wireless network. When the hurricane strikes the coastal city, the FEMA command center may rely on the mobile transportable private cloud computing platform 205 as a backup system.

Operational Example 2

In an operation example of the transportable private cloud computing platform 100, a ruggedized transportable private cloud computing platform 203 is deployed in a remote location by the U.S. Army. In this example, the remote location has no direct connection to the Internet and has intermittent and unreliable satellite access. The ruggedized transportable private cloud computing platform 203 is transported to the remote location on a HMMWV. Once on site, a soldier with little training in the field of cloud computing initializes the ruggedized transportable private cloud computing platform 205 by following the guidance of the interface device 105.

Once the soldier creates a secure private cloud instance on the ruggedized transportable private cloud computing platform 205, he is able to utilize the software application migration system to migrate software applications and data to the ruggedized transportable private cloud computing platform 205 to create a tactical operations center. The ruggedized transportable private cloud computing platform 205 also creates and maintains a secure wireless network, so small handheld and vehicle-mounted computer systems within range of the secure wireless network are able to exchange data and interact with the ruggedized transportable private cloud computing platform 205. An antenna could be attached to the ruggedized transportable private cloud computing platform 205 to provide more range for the wireless network.

Operational Example 3

In an operational example of the transportable private cloud computing platform 100, a modular transportable private cloud computing platform 204 is deployed in a parking space by the IT staff of a hospital. In this example, the IT staff is preparing to move all the hospital servers and computer equipment from a server room inside the hospital to a data center in a building adjoining the hospital. The hospital does not have the server capacity to move the servers piecemeal, and it does not have the budget to buy additional servers to facilitate the move. The modular transportable private cloud computing platform 204 is rented for a short time to enable the hospital to complete the relocation of its IT department and servers.

In this example, a member of the hospital IT staff with little training in the field of cloud computing initializes the modular transportable private cloud computing platform 204 by following the guidance of the interface device 105. Once the IT staff creates a private cloud instance on the modular transportable private cloud computing platform 204, he is able to utilize the software application migration system to migrate software applications and data from the hospital server room to the modular transportable private cloud computing platform 204. Software applications and data are hosted on the modular transportable private cloud computing platform 204 and the hospital IT systems continue to operate as the IT staff relocates equipment to the data center. Once the data center is operational, software applications and data are transferred from the modular transportable private cloud computing platform 204 to the data center and the modular transportable private cloud computing platform 204 is taken out of operation.

Furthermore, it should be understood that when introducing elements of the present invention in the claims or in the above description of the illustrative, but nonlimiting, embodiment of the invention, the terms "have," "having," "includes" and "including" and similar terms as used in the foregoing specification are used in the sense of "optional" or "may include" and not as "required." Similarly, the term "portion" should be construed as meaning some or all of the item or element that it qualifies.

Thus, there have been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims that follow.

What is claimed is:

1. A transportable private cloud computing platform, comprising:
    at least one rack adapted to store hardware components for running a private cloud instance;
    a plurality of servers mounted on the rack and capable of hosting private cloud operating systems, software applications and data storage, wherein the at least one of the plurality of servers includes a system management server that utilizes system management software for managing the physical resources, the virtual server instances, and the software;
    an interface device adapted to allow a system administrator to interact with the private cloud instance and to provide guidance to the system administrator to create and administer an operational private cloud that is connected to the plurality of servers;
    at least one network switch mounted on the rack; and
    a power supply circuit capable of distributing power to the plurality of servers, the interface device and the at least one network switch;
    wherein the transportable private cloud computing platform includes a transit case housing the power supply circuit, the plurality of servers, the interface device and the at least one network switch, the transit case adapted to be removably attachable to the transportable private cloud computing platform.

2. The transportable private cloud computing platform in accordance with claim 1, wherein the transportable private cloud computing platform is a stand-alone unit.

3. The transportable private cloud computing platform in accordance with claim 1, wherein the transportable private cloud computing platform has a mobility mechanism, the mobility mechanism adapted to be removably attachable to the transportable private cloud computing platform.

4. The transportable private cloud computing platform in accordance with claim 1, wherein the transit case is a hardened transit case.

5. The transportable private cloud computing platform in accordance with claim 3, wherein the transportable private cloud computing platform is ruggedized.

6. The transportable private cloud computing platform in accordance with claim 1, wherein the transit case is a resizable container capable of scaling to larger or smaller form factors.

7. The transportable private cloud computing platform in accordance with claim 1, wherein the transportable private cloud computing platform is adapted to create and maintain a wireless network.

8. The transportable private cloud computing platform in accordance with claim 1, wherein the transportable private cloud computing platform is adapted to be connected to a public cloud.

9. The transportable private cloud computing platform in accordance with claim 1, wherein the transportable private cloud computing platform is adapted to be connected to a community cloud.

10. The transportable private cloud computing platform in accordance with claim 1, wherein the interface device includes at least one of a keyboard, a video display, a mouse (KVM) switch, and a graphical user interface (GUI).

* * * * *